(12) United States Patent
Bhat et al.

(10) Patent No.: US 12,201,859 B2
(45) Date of Patent: Jan. 21, 2025

(54) SYSTEMS, DEVICES, AND METHODS FOR DESIGNING AND MANUFACTURING CUSTOM RESPIRATOR MASKS

(71) Applicant: THE ALGORITHMIC DESIGN CORPORATION, Sheridan, WY (US)

(72) Inventors: Rajiv Bhat, Palo Alto, CA (US); Jared West, New York, NY (US); Samuel E. Wurzel, New York, NY (US); Matthew Kelley, New York, NY (US)

(73) Assignee: The Algorithmic Design Corporation, Sheridan, WY (US)

( * ) Notice: Subject to any disclaimer, the term of this patent is extended or adjusted under 35 U.S.C. 154(b) by 601 days.

(21) Appl. No.: 17/322,353

(22) Filed: May 17, 2021

(65) Prior Publication Data

US 2021/0353973 A1    Nov. 18, 2021

Related U.S. Application Data

(60) Provisional application No. 62/704,620, filed on May 18, 2020.

(51) Int. Cl.
| | | |
|---|---|---|
| *A62B 7/10* | (2006.01) | |
| *A41D 13/11* | (2006.01) | |
| *A62B 9/00* | (2006.01) | |
| *A62B 18/08* | (2006.01) | |
| *A62B 23/02* | (2006.01) | |
| *B33Y 10/00* | (2015.01) | |
| *B33Y 50/00* | (2015.01) | |
| *B33Y 80/00* | (2015.01) | |

(52) U.S. Cl.
CPC ............ *A62B 7/10* (2013.01); *A41D 13/1146* (2013.01); *A62B 9/00* (2013.01); *A62B 18/08* (2013.01); *A62B 18/084* (2013.01); *A62B 23/02* (2013.01); *B33Y 10/00* (2014.12); *B33Y 50/00* (2014.12); *B33Y 80/00* (2014.12)

(58) Field of Classification Search
CPC ........... A61M 16/0605; A41D 13/1192; A41D 13/1161; A41D 31/145; A41D 13/11; A41D 2500/30; A62B 7/10; A62B 23/025; A62B 18/025
See application file for complete search history.

(56) References Cited

U.S. PATENT DOCUMENTS

2015/0045926 A1*  2/2015  Thornton ............... A61M 16/06
                                                       700/98
2019/0358473 A1*  11/2019 Szasz .................... A62B 23/025

\* cited by examiner

*Primary Examiner* — Ophelia A Hawthorne
(74) *Attorney, Agent, or Firm* — Resonance IP Law, PC

(57) ABSTRACT

Respirator masks may include a respirator mask body and a respirator mask gasket. The respirator mask body may include a plurality of openings for the exchange of gas and an air filtration media configured to filter particles from air passing into and out of the respirator mask body. The respirator mask gasket may be coupled to the respirator mask body and may be sized and shaped responsively to a three-dimensional scan of a portion of user's face including the user's nose and mouth and being configured to closely abut the user's face when worn. A combination of respirator mask body and respirator mask gasket may be positioned within a donning mechanism that facilitates positioning of the combined respirator mask body and respirator mask gasket over the user's face and retention thereon.

3 Claims, 22 Drawing Sheets

500

1000

SYSTEMS, DEVICES, AND METHODS FOR DESIGNING AND MANUFACTURING CUSTOM RESPIRATOR MASKS

RELATED APPLICATION

This application is a NON-PROVISIONAL of U.S. Provisional Patent Application No. 62/704,620 filed on 18 May 2020 and entitled "SYSTEMS, DEVICES, AND METHODS FOR DESIGNING AND MANUFACTURING CUSTOM RESPIRATOR MASKS," which is incorporated in its entirety herein.

FIELD OF INVENTION

The present invention generally relates to respirator masks and, in particular, to customized respirator masks and methods for manufacturing same.

BACKGROUND

Respirator masks may be worn for a plurality of reasons to filter air coming into and/or out of a user's/wearer's lungs in order to, for example, prevent the user's inhalation of toxins or pathogens from the ambient air and/or exhalation of toxins or pathogens from the user into the ambient air. A common problem with traditional respirator masks is that they are uncomfortable to wear and/or fit user's faces poorly, which adversely impacts their efficacy.

SUMMARY

Customized respirator masks and/or respirator mask inserts disclosed herein may include a respirator mask body and a respirator mask gasket coupled to the respirator mask body. The respirator mask body may include a plurality of openings for the exchange of gas and an air filtration media configured to filter particles from air passing into and out of the respirator mask body. On some occasions, the respirator mask body may be of a standard size (i.e., not customized to the user's face) and the respirator mask gasket may be customized and/or specific to a user.

The respirator mask gasket may be customized to a particular user by being sized and shaped responsively to a three-dimensional scan of a portion of user's face including the user's nose and mouth and being so that the respirator mask gasket closely fits, or abuts, the user's face when worn so that, in some instances, the respirator mask gasket is configured to have an air-tight seal with the user's face. In some embodiments, the respirator mask gasket is added to the respirator mask body via an injection molding process. In some cases, the respirator mask gasket may be coupled to the respirator mask body via at least one of a mechanical interlocking mechanism, adhesive bonding, magnetic attraction, and heat bonding. In some embodiments, the respirator mask gasket may be made from a deformable material such as silicon, plastic, or vinyl.

The respirator mask gasket may be customized by designing it using a model that overlays a model, or computer rendering of a respirator mask gasket blank onto the three-dimensional scan of the portion of user's face and a Boolean subtraction may be performed on the respirator mask gasket blank to subtract portions of the respirator mask gasket blank responsively to the one or more features of the user's face so that the respirator mask gasket blank fits the portion of the user's face and/or has features that are responsive to the features of the user's face.

The respirator mask, respirator mask gasket, and/or the respirator mask body may be manufactured via, for example, a three-dimensional printing process, an injection molding process, and/or a stamping process.

At times, a combination of the respirator mask body and respirator mask gasket may be referred to herein as a respirator mask insert. The respirator mask insert may be configured so that it cooperates with a donning mechanism that is configured to accept insertion of a combination of the respirator mask body and respirator mask gasket (i.e., respirator mask insert) and wrap around the user's head when the respirator mask is worn by the user. At times, the donning mechanism may include an opening sized and positioned for removable insertion of the combination of the respirator mask body and respirator mask gasket. The opening may be configured to hold the respirator mask insert in place when the respirator mask is being worn by the user.

An injection mold systems for manufacturing a respirator mask insert may include a respirator mask body mold portion and a respirator mask gasket mold portion. The respirator mask gasket mold portion and/or respirator mask body portion may be manufactured using a three-dimensional printing process.

The respirator mask body mold portion may be configured to generate a respirator mask body that includes a plurality of openings for the exchange of gas and an opening for the insertion of a filtration media. At times, the respirator mask body mold portion may be standardized and not specific to the user.

The respirator mask gasket mold portion may be customized so that it is sized and shaped responsively to a three-dimensional scan of a portion of user's face including the user's nose and mouth. The respirator mask gasket mold portion may be configured to couple to the respirator mask body mold portion, thereby forming a complete mold, so that a material may be injected into the complete mold. Exemplary materials injected into the mold include, but are not limited to, silicon, plastic, vinyl, and rubber.

Methods for fabricating a respirator mask and/or respirator mask insert may include receiving a three-dimensional scan of a portion of user's face including the user's nose and mouth, analyzing the three-dimensional image of a portion of user's face to determine one or more features thereof, receiving a respirator mask blank model, modifying the respirator mask blank model responsively to the one or more features of the portion of user's face, generating a model of a custom fit respirator mask configured to correspond to the portion of the user's face, converting the model into a set of instructions for the manufacture of the custom fit respirator mask, and communicating the set of instructions to a manufacturing machine.

In some embodiments, receiving the respirator mask blank may include selecting the respirator mask blank from a plurality of mask blanks responsively to the analysis of the three-dimensional image of a portion of user's face or the one or more features of the portion of the user's face. The respirator mask blank may be a standardized respirator mask blank. In some cases, the respirator mask blank may come in a variety of sizes such as small, medium, large, and extra-large. Sizing of the respirator mask blank may be dependent upon a size of the user and/or the user's face and/or features thereof.

In some embodiments, a model or CAD rendering of the respirator mask blank may be overlaid on the three-dimensional scan of a portion of user's face and a Boolean subtraction may be performed on the mask blank and/or a model thereof to subtract portions of the mask blank responsively to the one or more features of the user's face thereby generating a model of a customized respirator mask gasket and/or a set of instructions for the generation of a customized respirator mask gasket and/or an injection mold for the fabrication of a customized respirator mask gasket.

WRITTEN DESCRIPTION

Figure 1:
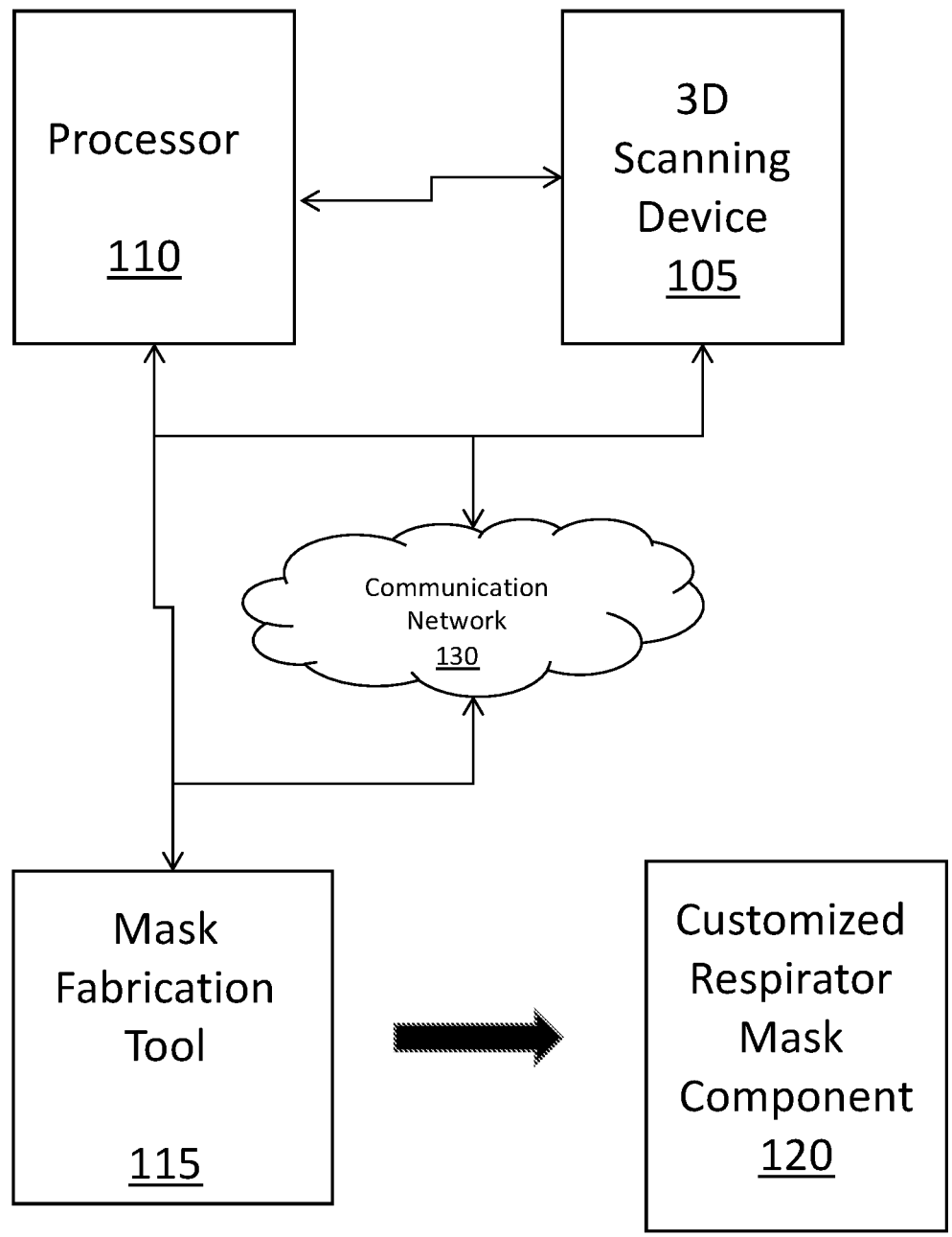
FIG. 1 is a block diagram of a system for designing and manufacturing custom respirator masks, in accordance with some embodiments of the present invention.

FIG. 1 is a block diagram of a system 100 for designing and manufacturing custom fit respirator masks. System 100 includes a three-dimensional scanning device 105, a respirator mask design module 110, a respirator mask fabrication tool 115, a customized respirator mask component 120, and a communication network 130. Communication between two or more components of system 100 may be facilitated by, for example, direct communication via, for example, a wired or wireless coupling and/or via communication network 130. Communication network 130 may be, for example, the Internet.

Three-dimensional scanning device 105 may be any scanner configured to take one or more images of a user's face that may be rendered in a three-dimensional fashion showing, for example, various features of the user's face in a topographical manner that show sizes, shapes, and/or relative proportions and/or locations of facial features (e.g., lips, nose, chin, etc.). Exemplary three-dimensional scanning devices 105 include, but are not limited to three-dimensional cameras configured to take three-dimensional scans of a face. In some embodiments, three-dimensional scanning device 105 may be resident within a personal electronic device, such as a smartphone or tablet computer, operated by the user. In some embodiments, a three-dimensional image of a user's face may be generated using multiple two dimensional images of the user's face and, in these embodiments, system 100 may not include three-dimensional scanning device 105.

Processor 110 may be, for example, a computer, a processor, and/or a server configured to execute one or more of the processes described herein. For example, processor 110 may be configured to receive a three-dimensional scan (or multiple two-dimensional images) of the user's face and generate a set of instructions for mask fabrication tool 115 so that mask fabrication tool may generate customized respirator mask component 120. Exemplary mask fabrication tools 115 include, but are not limited to, three-dimensional printers and injection molding equipment.

Figure 2:
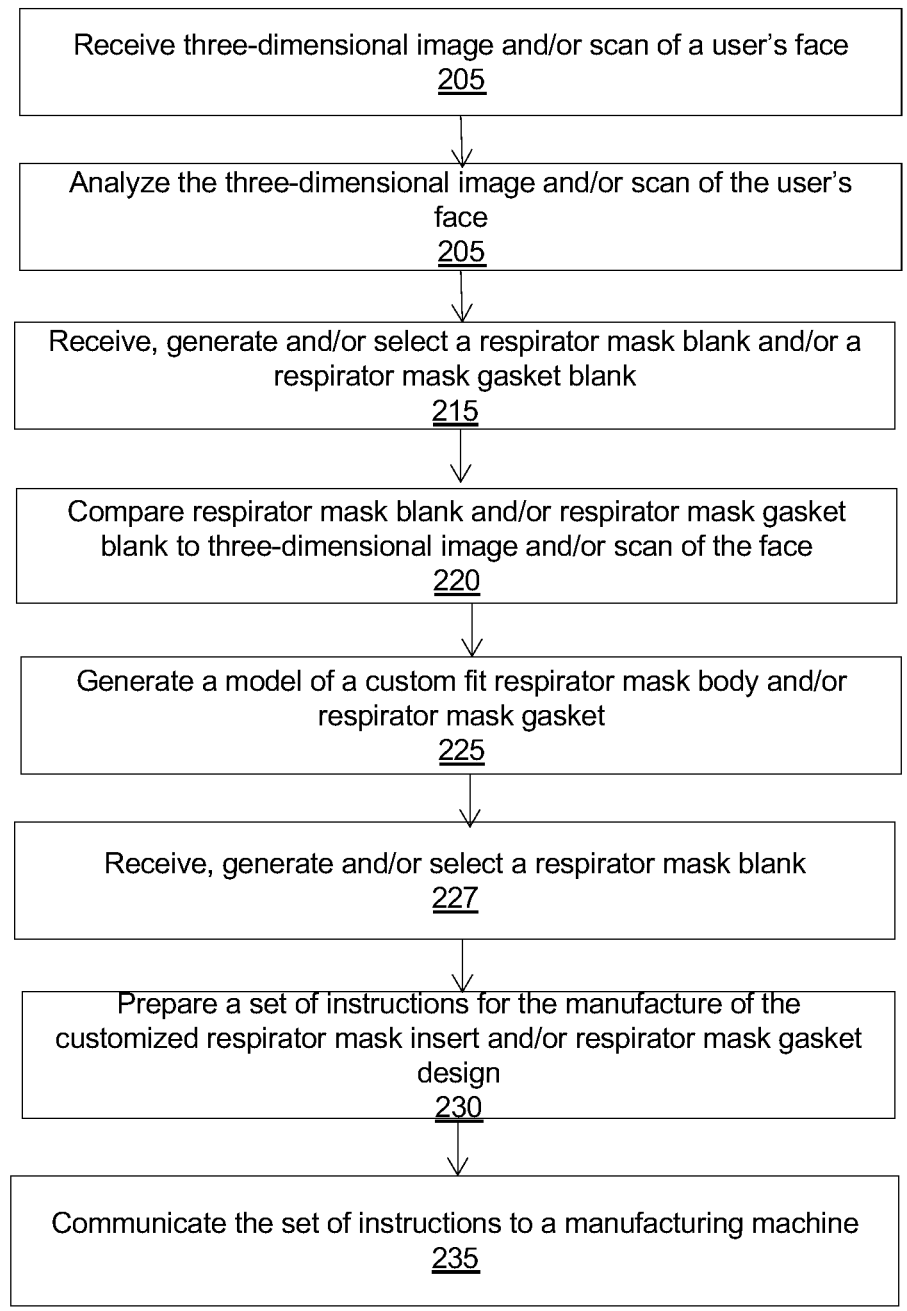
FIG. 2 is a flowchart showing a process for designing and manufacturing custom respirator masks, in accordance with some embodiments of the present invention.

FIG. 2 is a flowchart showing a process 200 for designing and manufacturing customized respirator masks, customized respirator mask inserts, and/or components thereof. Process 200 may be executed by, for example, system 100 or components thereof.

Figure 3:
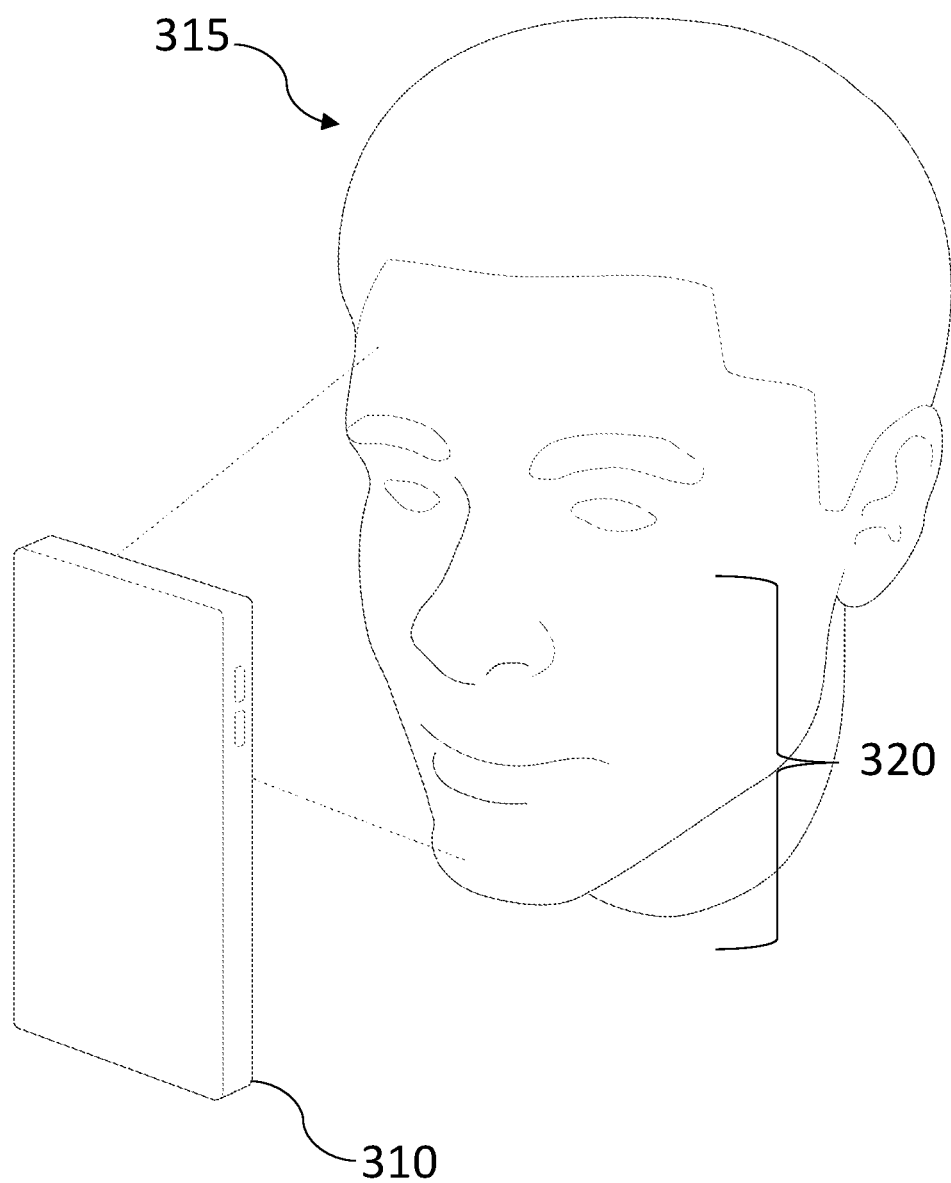
FIG. 3 is an illustration of a user scanning his face in order to generate a three-dimensional scan and/or multiple two-dimensional images that may be used to generate a three-dimensional image thereof, in accordance with some embodiments of the present invention.

Initially, in step 205, a three-dimensional image or scan and/or two dimensional images of a user's face may be received by a processor, such as processor 110. FIG. 3 is an illustration of a user scanning his face in order to generate a three-dimensional scan and/or multiple two-dimensional images that may be used to generate a three-dimensional image thereof. The three-dimensional scan may have been taken by a three-dimensional scanner such as three-dimensional scanning device 105 that communicates it to a processor such as processor 110.

The three-dimensional image and/or scan (or multiple two-dimensional images) of the user's face may then be analyzed (step 210) to, for example, generate a model thereof and/or determine topographical features of the user's face and relative positions for various features of the user's face. For example, in some embodiments, the analysis of step 210 may include determining where the user's chin is, a lower line of the chin, a centerline for the user's face, a location for an apex of the user's nose, a width of a bridge of the user's nose, a distance between a bridge of the user's nose and the bottom of the user's chin, etc. In some embodiments, the three-dimensional image and/or scan may be analyzed in step 210 to determine a contour, shape, or configuration of the user's face or a portion thereof. Additionally, or alternatively, the analysis of step 210 may also include processing the three-dimensional scan to remove noise from the dataset in preparation for execution of, for example, step(s) 215, 220, and/or 225 as explained below.

Optionally, the analysis of the scans/images of the user's face may be used to select and/or generate a general respirator mask body blank and/or a respirator mask gasket blank which may serve as a base for the customized respirator mask (step 215). The general respirator mask body blank and/or a respirator mask gasket blank may be selected and/or generated so that it may fit over the user's face and accommodate the topographical features of the user's face (e.g., does not touch or press upon an apex of the user's nose, fully fits over the user's mouth, is large/small enough to for a good seal with the user's face, and/or will extend the length of the face between the user's nose bridge and the bottom of the user's chin). A respirator mask body blank and/or a respirator mask gasket blank may be selected from a predetermined set of standard sizes (e.g., small, medium, large, adult, child, infant, etc.) to accommodate a given face size determined by analysis of the three-dimensional scan of the user's face.

In some instances, generation and/or selection of a respirator mask body blank and/or a respirator mask gasket blank may be based on a determination of, for example, contours of the user's face, a shape of the filter holder within the customized face mask, a degree of clearance between the user's face and the air filtration media, requirements for the air filtration media, respiration requirements of the user, a shape/size of the air filter, a size of the user, comfort considerations, user preferences, and/or general aesthetic considerations.

Additionally, or alternatively, in some embodiments, generation of the respirator mask body blank and/or a respirator mask gasket blank may include determining an intersection of the three-dimensional face scan with the respirator mask body blank and/or a respirator mask gasket blank and performing a Boolean operation to subtract the intersecting volume of the three-dimensional face scan from the respirator mask body blank and/or a respirator mask gasket blank, resulting in a contour on the respirator mask body blank and/or a respirator mask gasket blank that exactly matches the surface of the face scan. When step 215 is performed this way, execution of steps 220 and 225 may be unnecessary.

Figure 4:
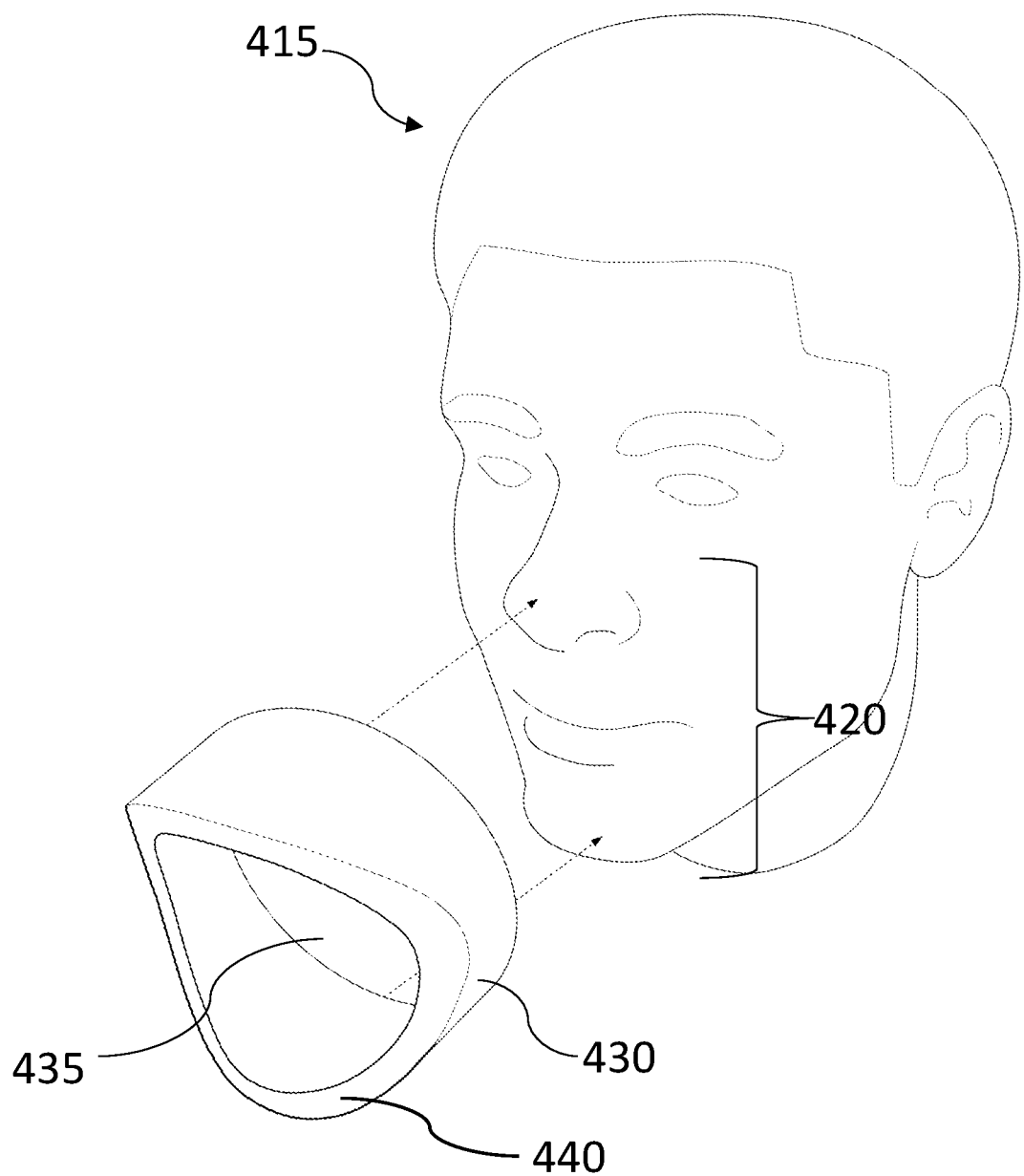
FIG. 4 provides an illustration of a model of the user's face and a portion thereof 420 that the custom respirator mask will fit over that, in this case, includes the user's nose and mouth, in accordance with some embodiments of the present invention.

FIG. 4 provides an illustration of a model 415 of the user's face and a portion thereof 420 that the custom respirator mask will fit over that, in this case, includes the user's nose and mouth. FIG. 4 also shows a respirator mask gasket blank 430 that may be modified using process 200 so that it is customized to the user's face. Respirator mask gasket blank 430 is part of a two piece system that also includes a respirator mask body (not shown). Respirator mask gasket blank 430 includes an opening 435 through which air/gas may be exchanged and a surface 440 configured to couple to the respirator mask body via, for example, heat, chemical, and/or mechanical bonding between respirator mask gasket blank 430 and the respirator mask body.

In step 220, a comparison of the respirator mask body blank and/or a respirator mask gasket blank and the three-dimensional image and/or scan of the user's face may be made. In some embodiments, step 220 may be executed by overlaying a rendering of a generated and/or selected respirator mask body blank and/or a respirator mask gasket blank on top of the 3-D scan of the user's face to, for example, determine where, or if, the respirator mask body blank and/or a respirator mask gasket blank overlaps with, or touches, the user's face. Then, a custom fit respirator mask body and/or respirator mask gasket model may be generated by, for example, adjusting the shape and or size of the respirator mask body blank and/or a respirator mask gasket blank (step 225). Adjusting the shape and or size of the respirator mask blank may involve, for example, removing portions of the respirator mask body blank and/or a respirator mask gasket blank, reducing or increasing a size of a portion of the respirator mask body blank and/or a respirator mask gasket blank, and/or adjusting a shape and/or a size of the respirator mask body blank and/or a respirator mask gasket blank. Adjusting the shape or size of the respirator mask body blank and/or a respirator mask gasket blank may also involve performing a Boolean operation to subtract the intersection of the face scan from the respirator mask body blank and/or a respirator mask gasket blank.

Step 225 may be executed such that the custom fit respirator mask and/or custom fit respirator mask gasket sits proximate to the skin of the user when worn thereby forming a seal, which in some instances may be air tight. In some embodiments, a contour of the user's face, or a portion thereof, (as determined in, for example, step 210) may then be used to determine where intersections between the user's face and a mask blank and/or fabricated mask may be. A shape of the mask blank may then be generated and/or modified to fit, or approximately fit, one or more facial contours. In some embodiments, execution of step 225 may include Boolean combinations of a respirator mask body blank and/or a respirator mask gasket blank and the three-dimensional face scan or algorithmic extrusion of a respirator mask body and/or a respirator mask gasket from a closed face contour.

Figure 5:
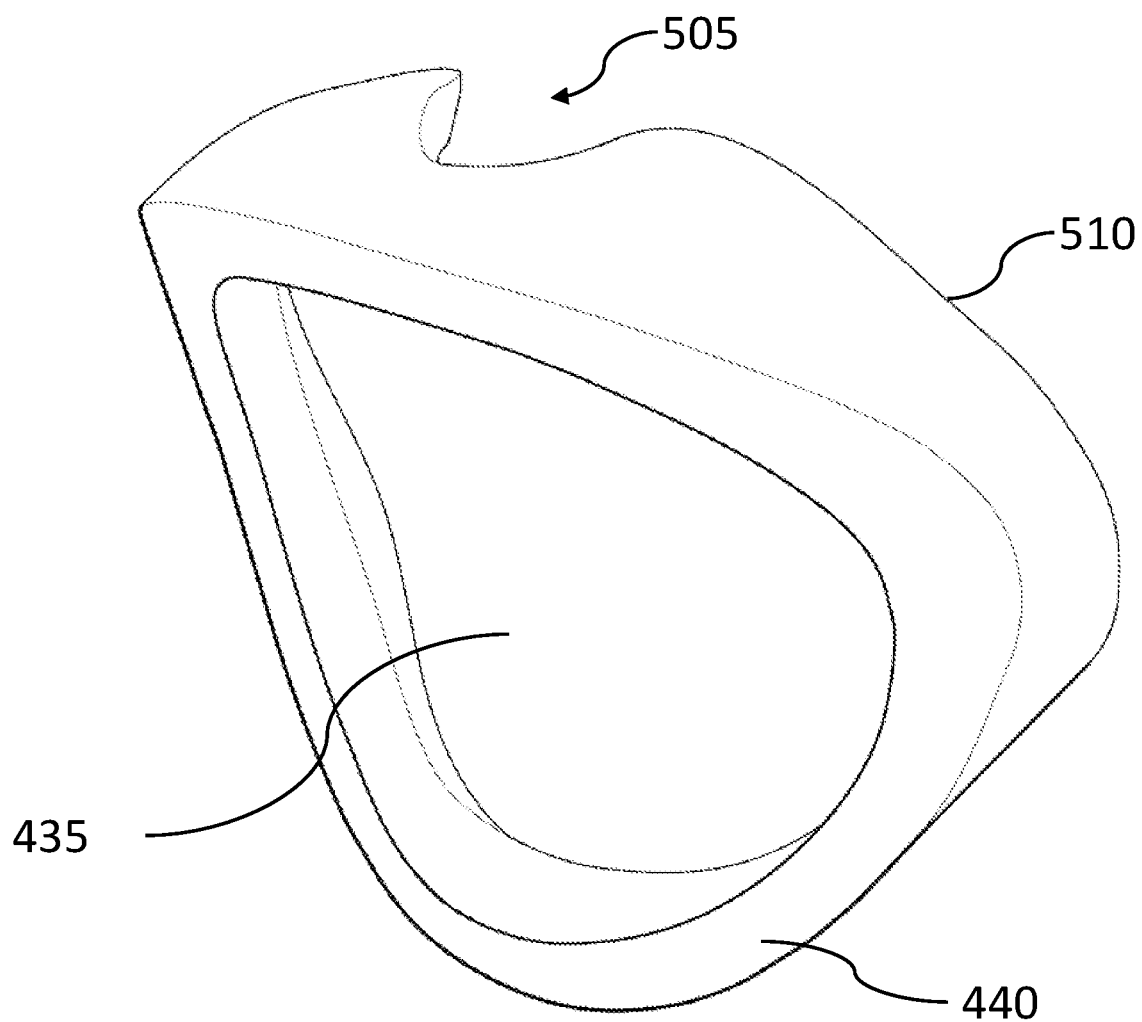
FIG. 5 is an illustration showing a rendering of a model of a customized respirator mask gasket that may be generated via execution of step, in accordance with some embodiments of the present invention.
Figure 6:
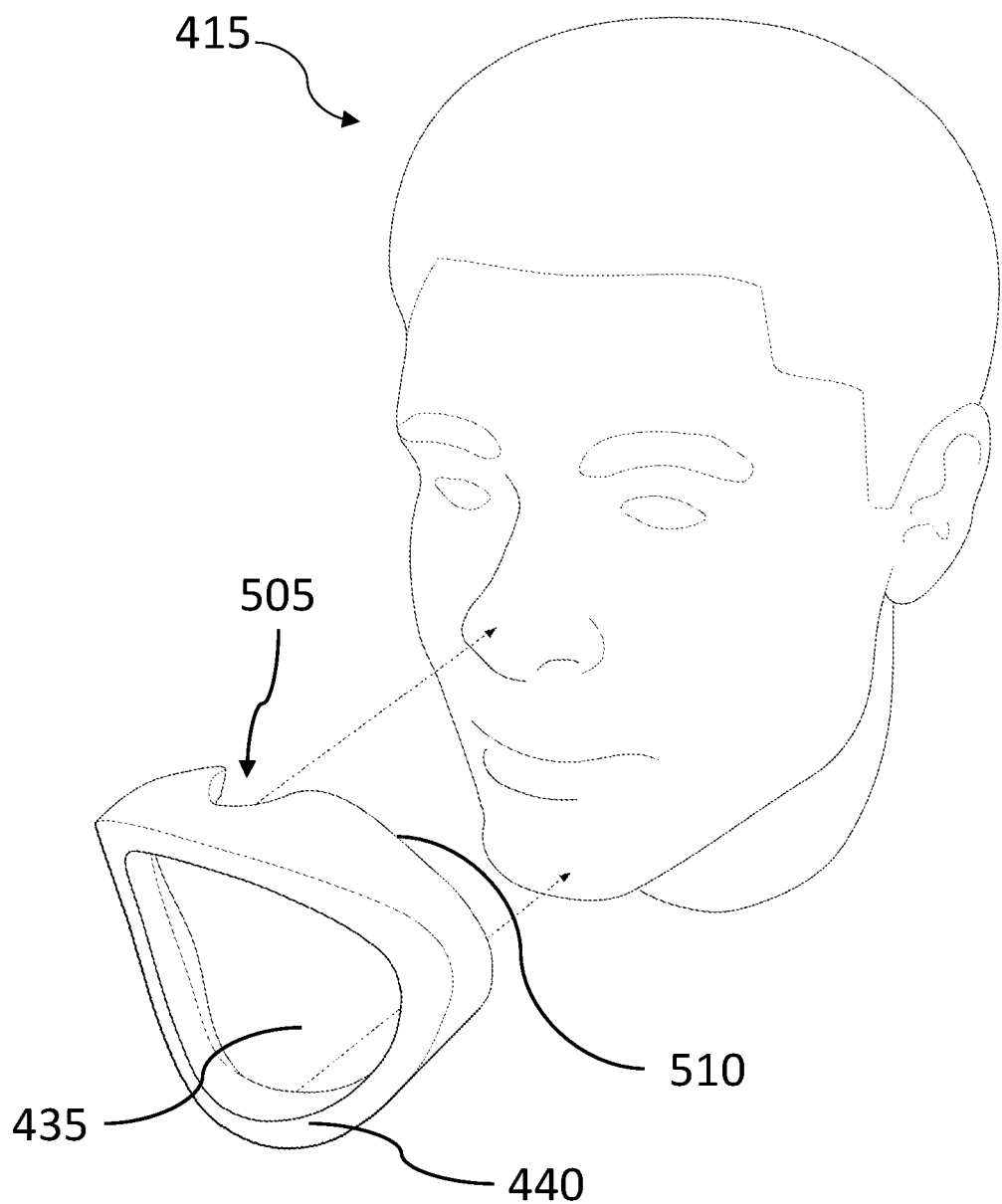
FIG. 6 is an illustration showing a rendering of model of a customized respirator mask gasket as it aligns with model of user's face, in accordance with some embodiments of the present invention.
Figure 7:
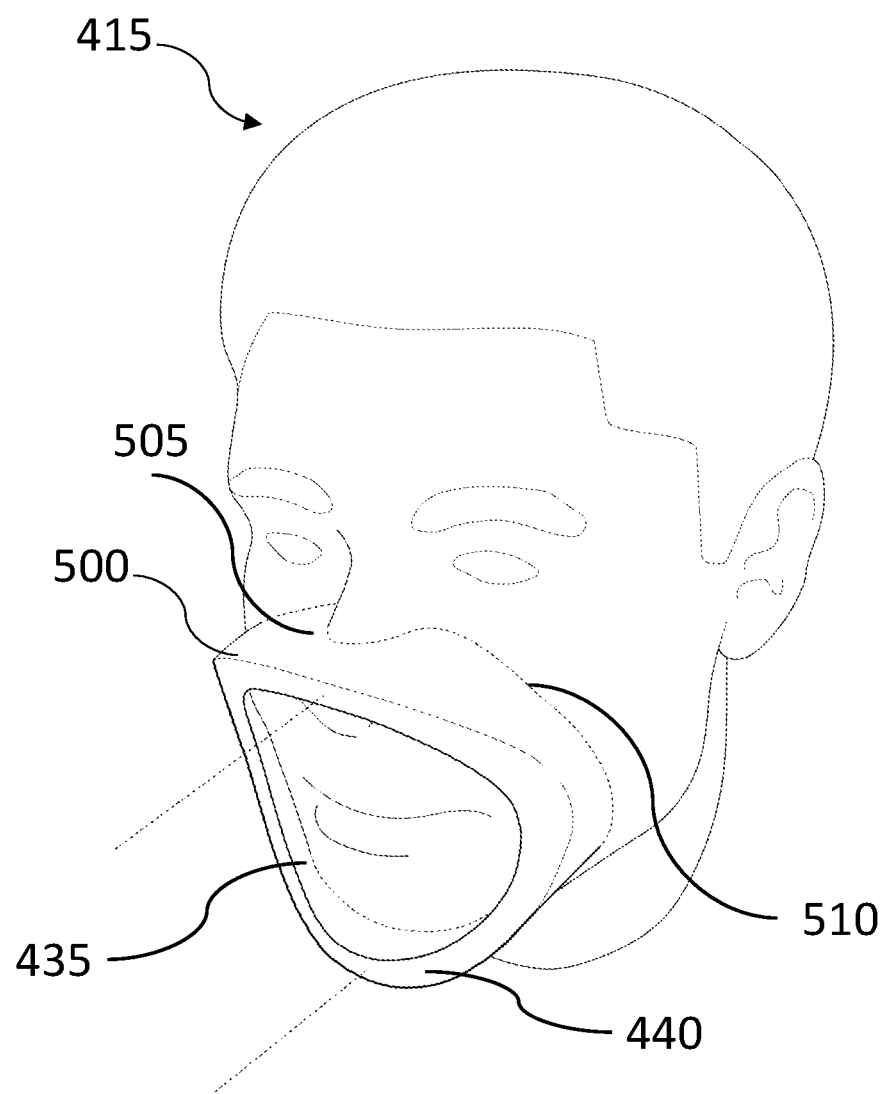
FIG. 7 is an illustration showing a rendering of customized respirator mask overlaid upon on the exemplary three-dimensional scan of the user's face, in accordance with some embodiments of the present invention.

FIG. 5 is an illustration showing a rendering of a model of a customized respirator mask gasket 500 that may be generated via execution of step 225. Customized respirator mask gasket model 500 includes opening 435, surface 440, a contoured edge 510 configured to match the facial contours of the user, and a notch 505 configured to allow insertion of the user's nose therein. FIG. 6 is an illustration showing a rendering of model of a customized respirator mask gasket 500 as it aligns with model of user's face 415. FIG. 7 is an illustration showing a rendering of customized respirator mask 500 overlaid upon on the exemplary three-dimensional scan of the user's face 300 so that the user's nose is positioned within notch 505 and contoured edge 510 is proximate to and/or abuts the user's face. To accommodate the size and shape of customized respirator mask 500 may be adjusted based upon, for example, the analysis and comparison of steps 215 and 220. More specifically, a particular volume of the mask blank has been cut away to accommodate a size and shape of the user's cheeks, nose, and general facial structure.

Figure 8:
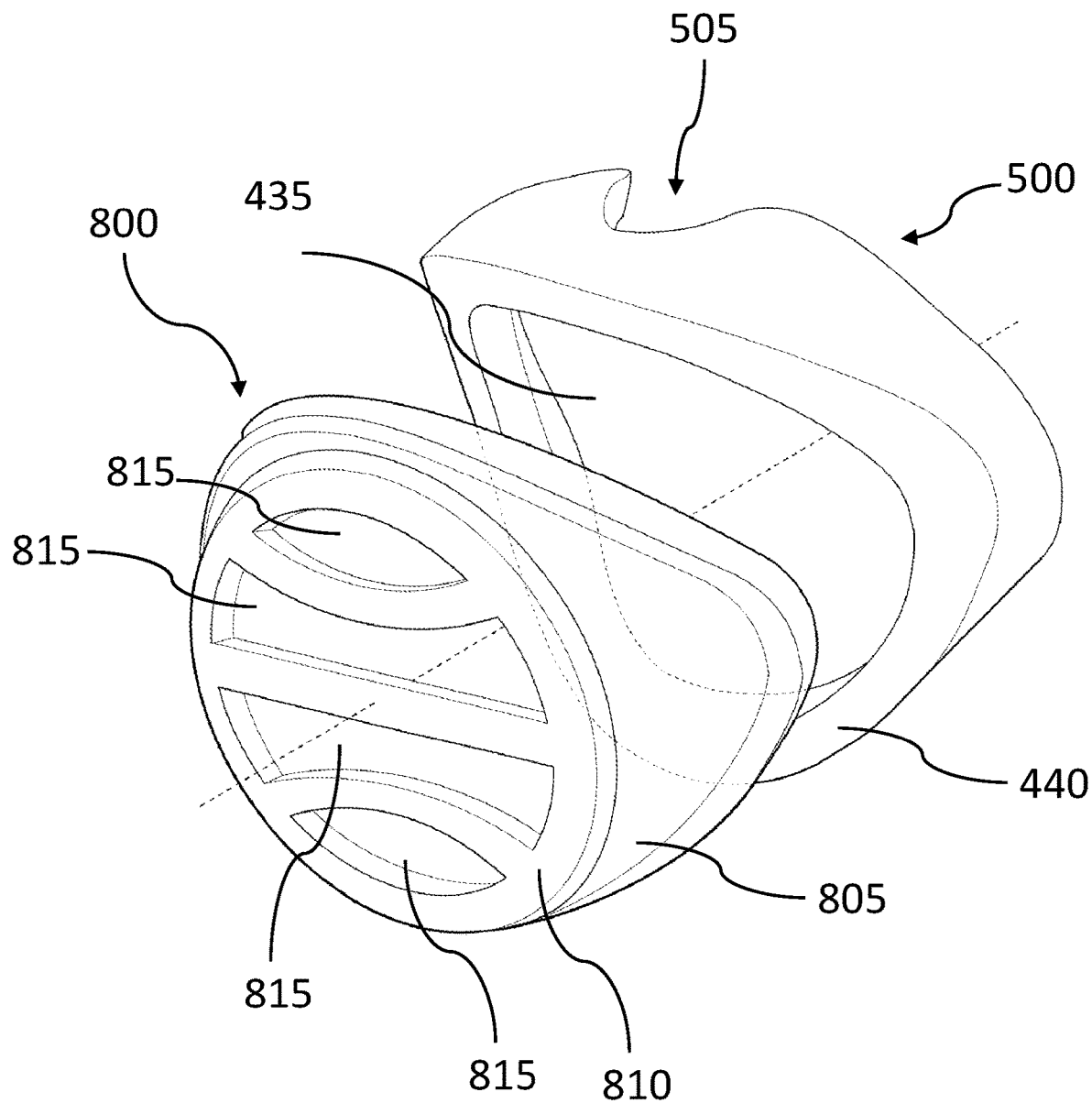
FIG. 8 is an illustration of a model of an exemplary respirator mask body blank selected and/or generated for cooperation with a customized respirator mask gasket, in accordance with some embodiments of the present invention.

When a custom fit model of respirator mask gasket is generated in step 225, a respirator mask body blank may be received, selected, and/or generated to fit with the customized respirator mask gasket to complete the respirator portion of the customized respirator mask (step 227). A model of an exemplary respirator mask body blank 800 selected and/or generated for cooperation with a customized respirator mask gasket 500 is shown in FIG. 8. Respirator mask body blank model 800 includes a housing 805 with an edge configured to be coupled to surface 440 of respirator mask gasket 500 and extend outwards therefrom. Respirator mask body blank model 800 also includes a filter housing 810 that provides a plurality of holes through which air/gas may be exchanged. Filter media (not shown) may be positioned behind filter housing 810. When combined, respirator mask body blank model 800 and respirator mask body gasket 500 make a filter portion of a customized respirator mask.

In some embodiments, respirator mask body blank model 800 may be of a standard size and/or selected from a standard set of sizes in order to, for example, streamline the manufacturing process so that only the respirator mask gasket needs to be customized. This may save manufacturing costs and time when compared with customizing the entire filter portion of a customized respirator mask.

Following execution of step 225 or step 227 (when executed), a set of instructions for the manufacture of the customized respirator mask and/or respirator mask gasket design may be prepared (step 230) and communicated to a mask fabrication tool such as mask fabrication tool 115 (step 235). The mask fabrication tool may then fabricate, or manufacture, the customized respirator mask and/or respirator mask gasket according to the set of instructions. Additionally, or alternatively, execution of step 230 may be involved creation of a set of instructions for the construction of mold that may be used to fabricate the customized respirator mask and/or customized respirator mask gasket. In these cases, preparation of the set of instructions in step 230 may involve creation a negative of the custom-fit respirator mask and/or respirator mask gasket design so that a mold for generating same via, for example, an injection molding process, may be generated. This mold may then be used to create the final customized respirator mask and/or respirator mask gasket. Molding materials for a final customized respirator mask and/or respirator mask gasket may include silicone, rubber, plastic, or others.

The mask fabrication tool may create a customized portion of the mask and a standardized portion of the mask containing a filtration mechanism separately in order to facilitate parallel manufacturing processes at scale. The customized portion of the mask may then be joined to the standardized portion through a mechanical lock, adhesive substance, or magnetic attraction.

Figure 9:
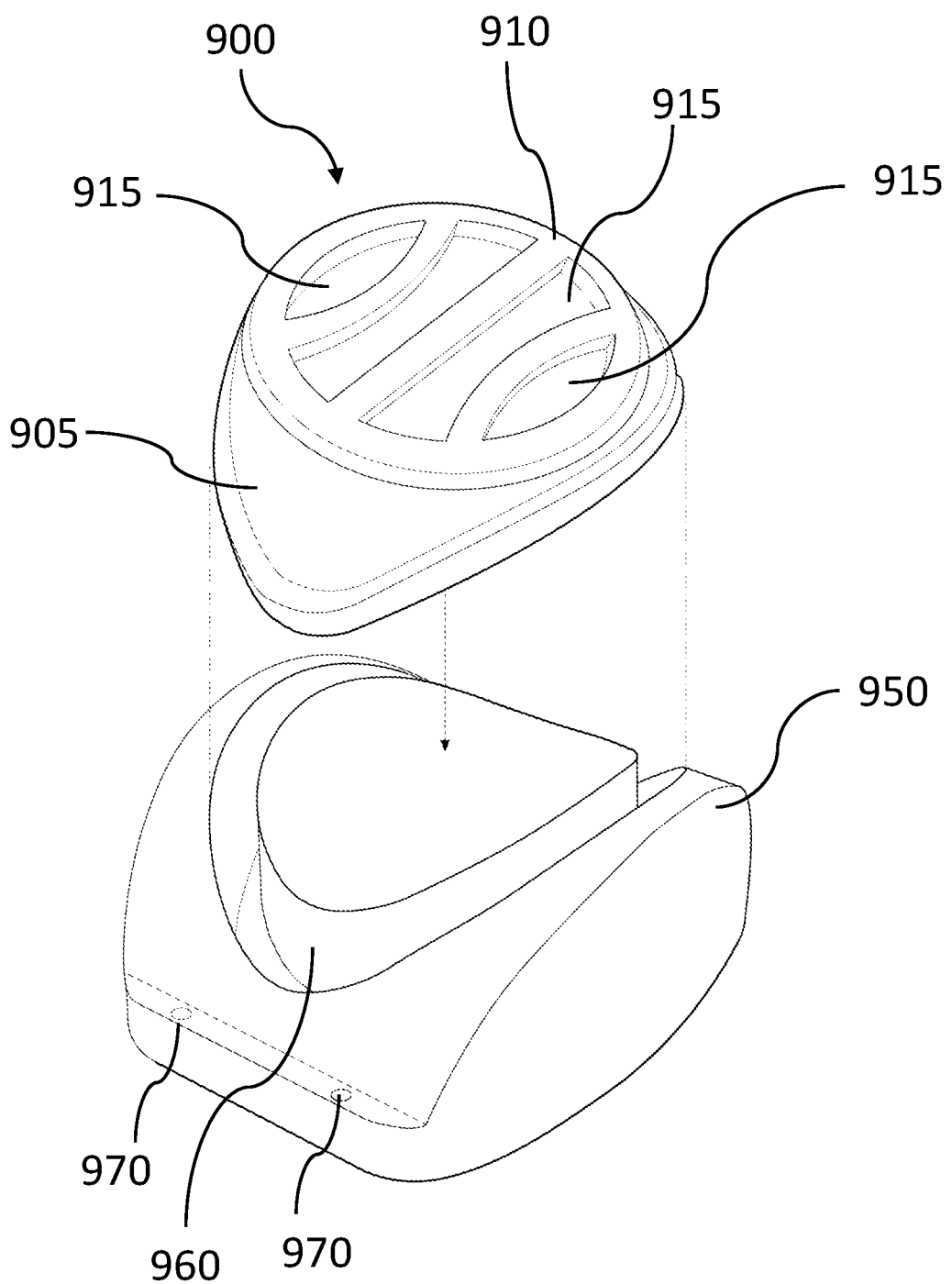
FIG. 9 provides an illustration of a pre-fabricated respirator mask body that may be inserted into an exemplary customized respirator mask gasket mold, in accordance with some embodiments of the present invention.
Figure 10:
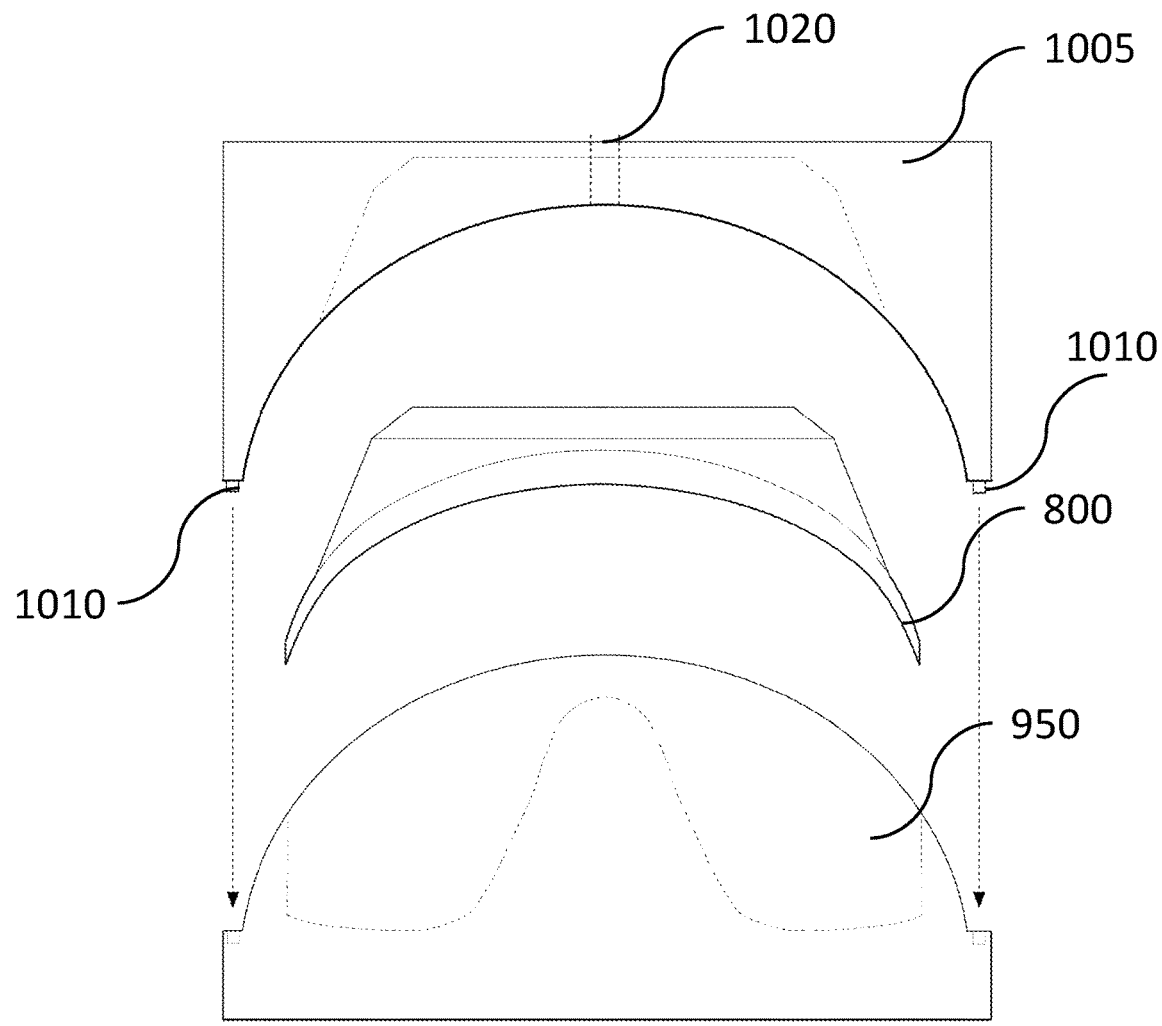
FIG. 10 provides exploded view of an exemplary customized respirator mask injection mold system, in accordance with some embodiments of the present invention.
Figure 11:
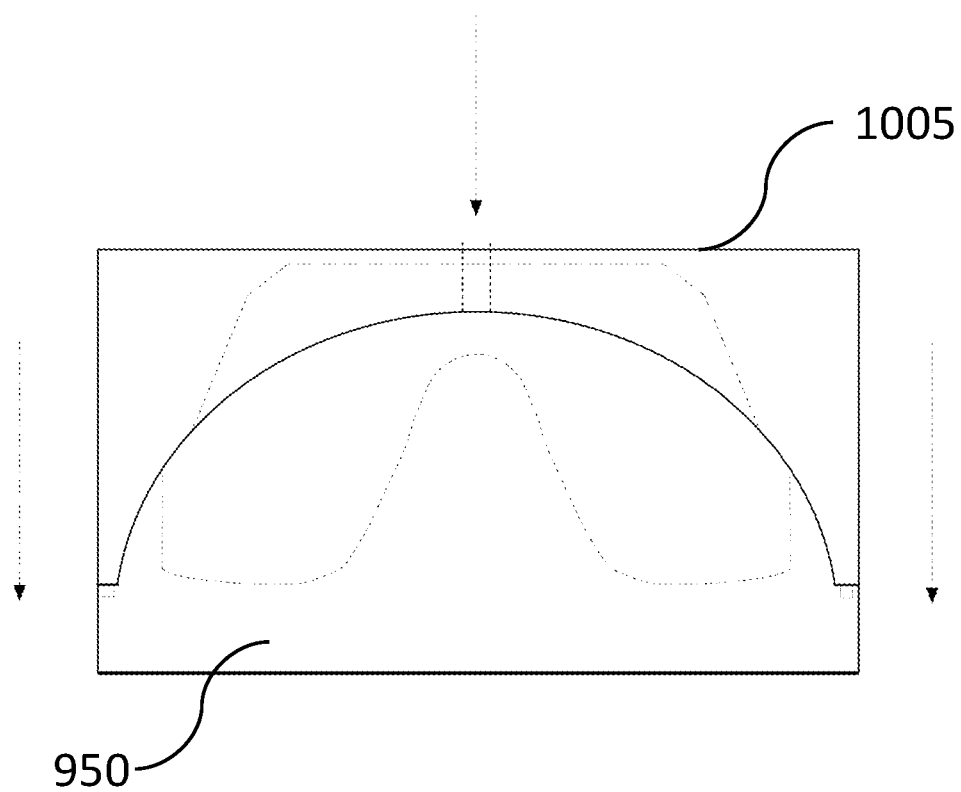
FIG. 11 provides an assembled view of customized respirator mask injection mold system, in accordance with some embodiments of the present invention.
Figure 12:
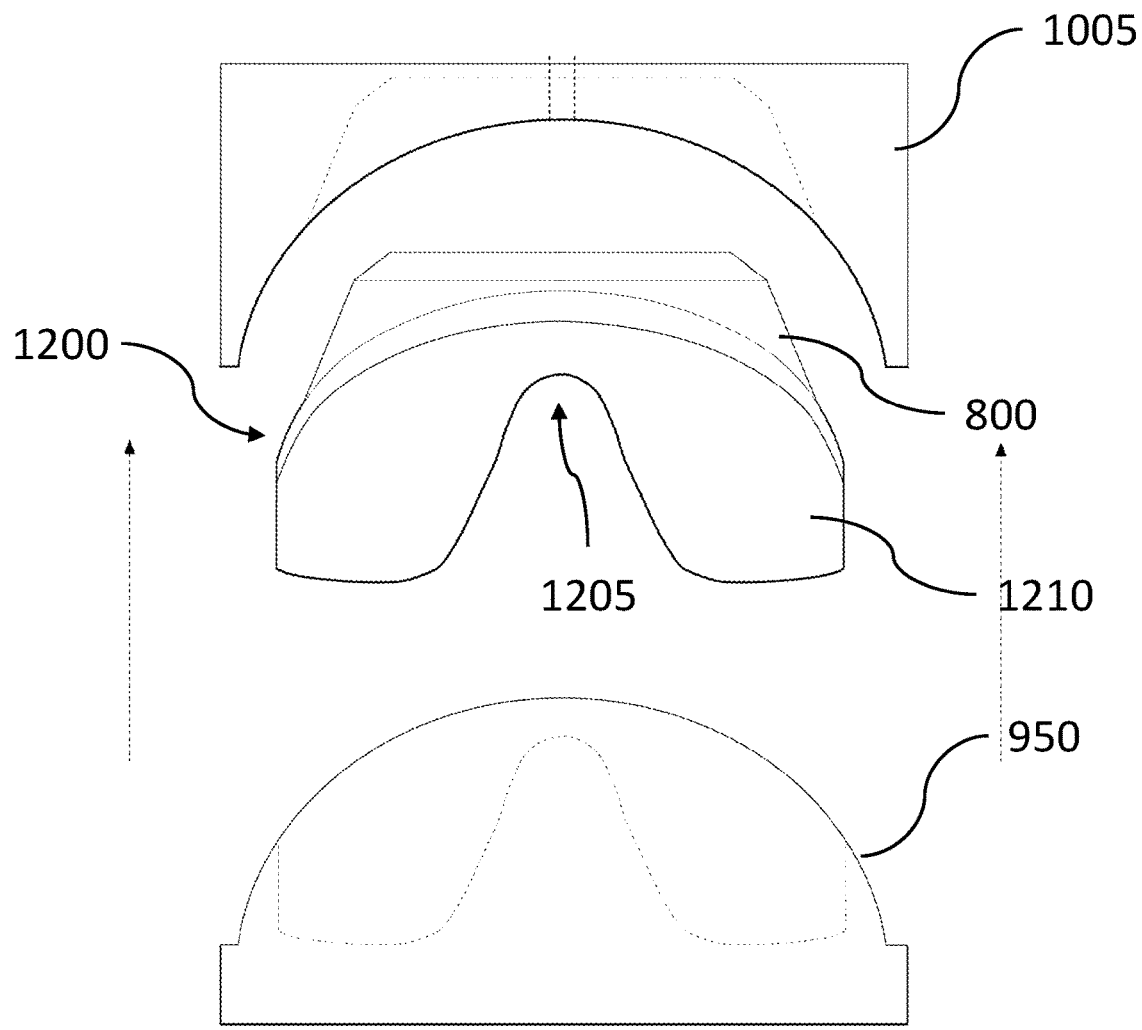
FIG. 12 provides an exploded side view of the injection molding system, in accordance with some embodiments of the present invention.
Figure 13:
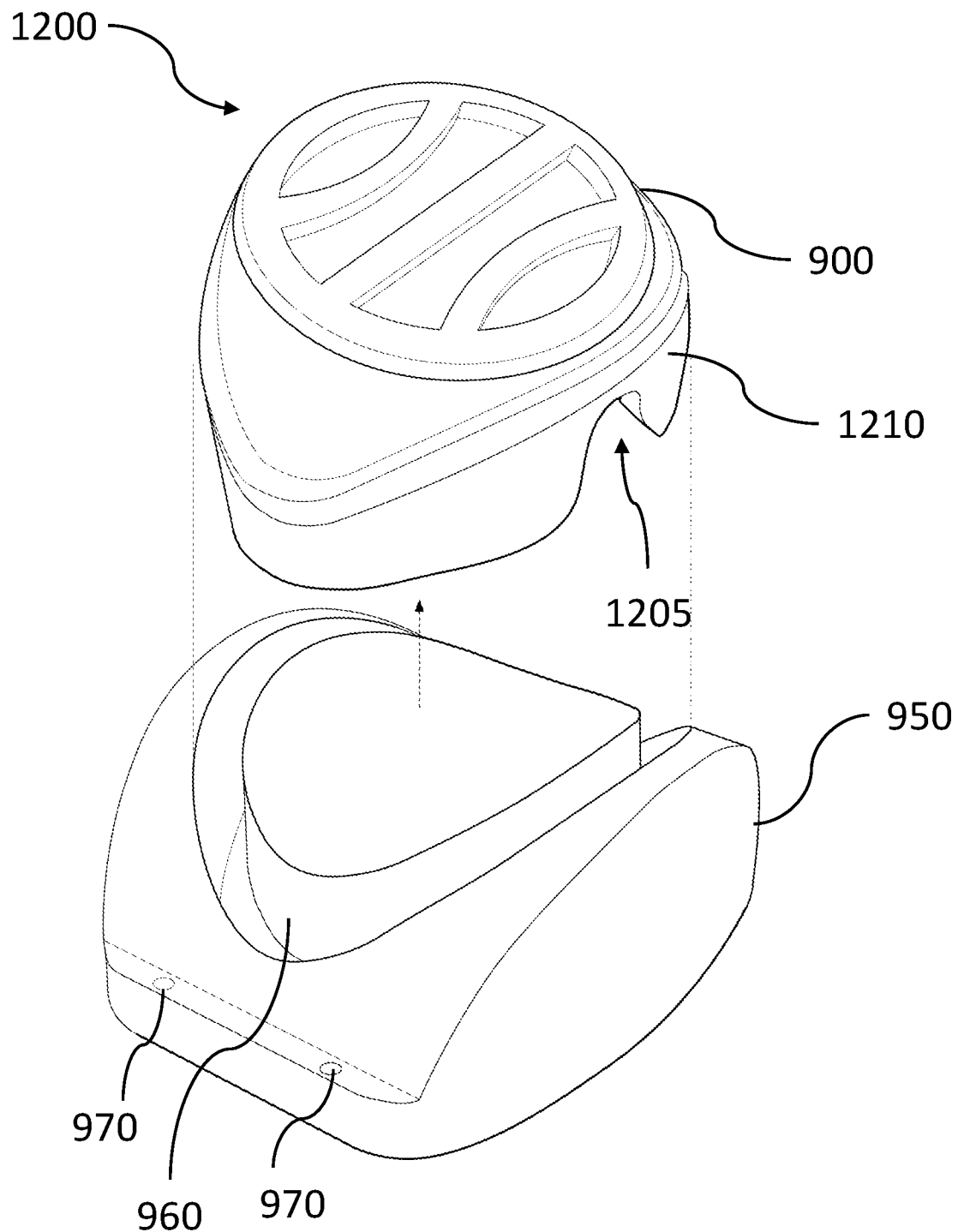
FIG. 13 provides an exploded perspective view of complete customized respirator mask insert separated from customized respirator mask gasket mold, in accordance with some embodiments of the present invention.

FIGS. 9-13 provide a time series of an injection molding process for a customized respirator mask wherein FIGS. 9 and 10 occur first in time (i.e., set up of the injection mold system to generate a customized respirator mask), FIG. 11 occurs next in time (during the injection molding process), and FIGS. 12 and 13 occur last in time when the injection molding process is complete. More specifically, FIG. 9 provides an illustration of a pre-fabricated respirator mask body 900 that may be inserted into an exemplary customized respirator mask gasket mold 950 as shown. Pre-fabricated respirator mask body 900 includes a side panel 905 that may define a portion of a cavity (not shown) into which the user's face may be inserted and a respirator filter cap 910 that may include a plurality of holes 915 that allow for the exchange of air/gases through the respirator filter cap 910 typically through filtration media.

Exemplary customized respirator mask gasket mold 950 may be configured to have a negative space, or groove, 960 corresponding to a customized respirator mask gasket designed via execution of process 200, or portions thereof. Customized respirator mask gasket mold 950 also includes an attachment mechanism 970 in the form of two holes that are configured and arranged to cooperate with a corresponding alignment pins 1010 that are configured to facilitate alignment and attachment between customized respirator mask gasket mold 950 and a standard mold top 1005 as shown in FIG. 10. FIG. 10 provides exploded view of an exemplary customized respirator mask injection mold system 1000 that includes standard mold top 1005, which is configured for acceptance of pre-fabricated respirator mask body 900 therein and is further configured for attachment to and cooperation with customized respirator mask gasket mold 950. Pre-fabricated respirator mask body 900 may be a physical manifestation of respirator mask body model 800. Standard mold top 1005 also includes an opening, or orifice, 1020 by which injection molding material (e.g., silicon, plastic, vinyl, etc.) may be injected into the mold to create a customized respirator mask and/or customized respirator mask gasket.

FIG. 11 provides an assembled view of customized respirator mask injection mold system 1000 that shows standard mold top 1005 aligned with, and attached to customized respirator mask gasket mold 950 so that a customized respirator mask and/or customized respirator mask gasket may be created via injection of material into opening 1020. Alignment and/or fixation of standard mold top 1005 and customized respirator mask gasket mold 950 may be assisted insertion of pins 1010 into holes 970.

Once the injection molding process is complete, standard mold top 1005 may be separated from customized respirator mask gasket mold 950 and a complete customized respirator mask insert 1200 that includes respirator mask body blank 800 and a customized respirator mask gasket 1210 bonded thereto may be removed from injection mold system as shown in FIGS. 12 and 13, wherein FIG. 12 provides an exploded side view of injection molding system 1000 when standard mold top 1005 is removed from customized respirator mask gasket mold 950 to reveal complete customized respirator mask insert 1200 therebetween and FIG. 13 provides an exploded perspective view of complete customized respirator mask insert 1200 separated from customized respirator mask gasket mold 950. FIG. 12 also shows a notch 1205 in customized respirator mask gasket 1210 that corresponds notch 505 of modeled customized respirator mask gasket 500.

Figure 14A:
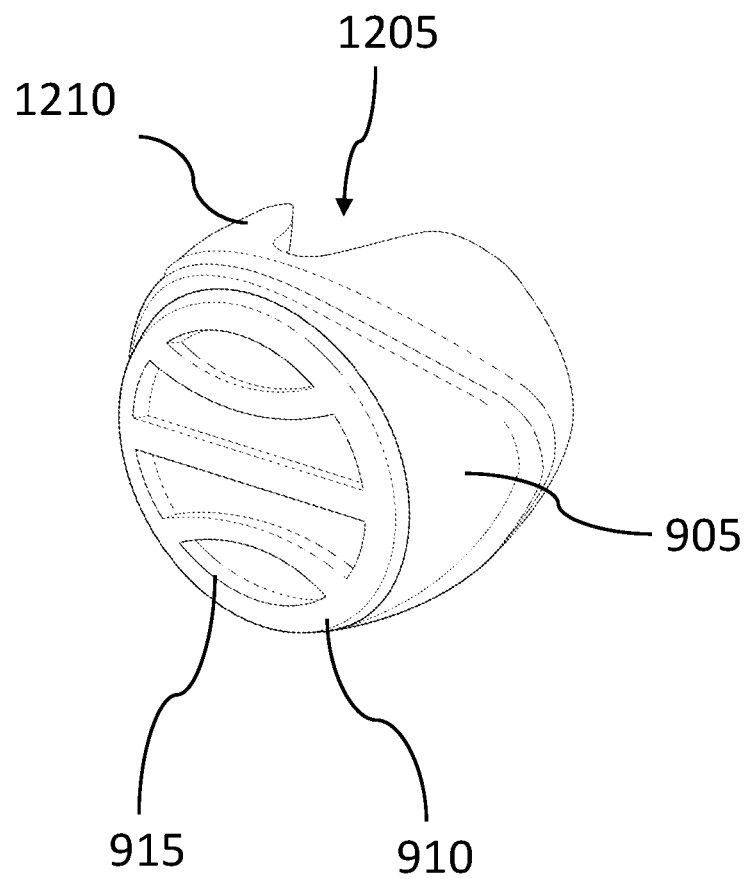
FIG. 14A provides a front perspective view of customized respirator mask insert, in accordance with some embodiments of the present invention.
Figure 14B:
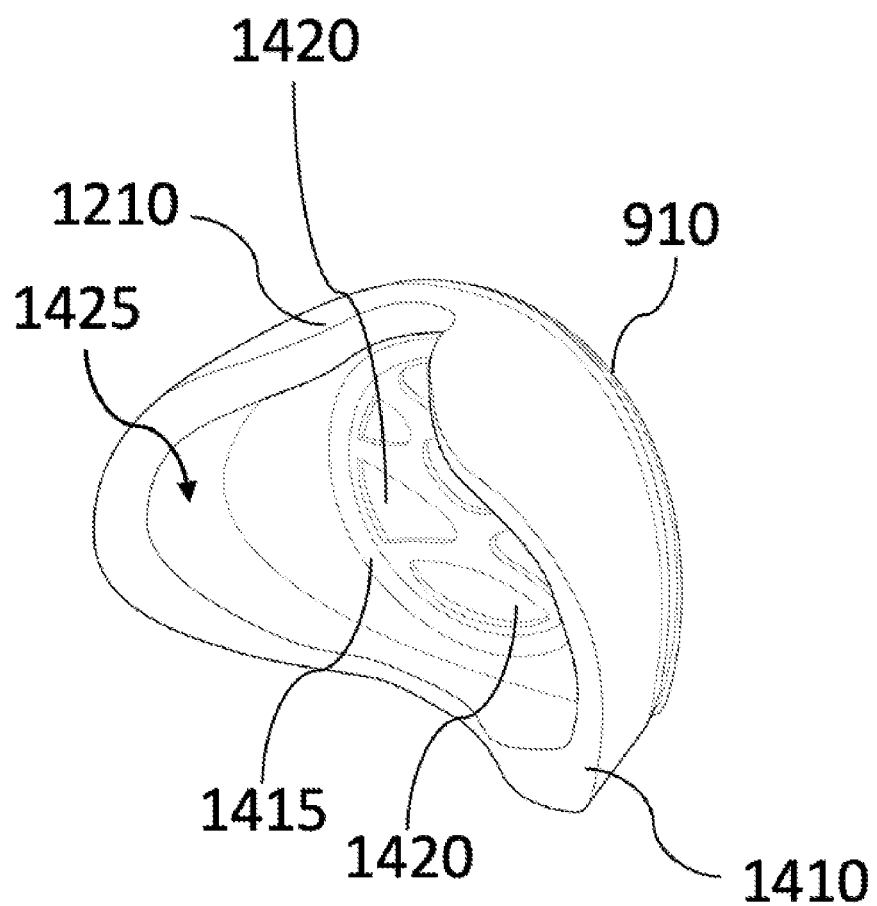
FIG. 14B provides a rear perspective view of customized respirator mask insert, in accordance with some embodiments of the present invention.

FIG. 14A provides a front perspective view of customized respirator mask insert 1200 and FIG. 14B provides a rear perspective view of customized respirator mask insert 1200. As seen in FIG. 14B, customized respirator mask insert 1200 includes an edge 1410 configured to correspond to the size and shape of the wearer's face so that the customized respirator mask insert 1200 is proximate to the user's face when worn and, in some embodiments, may form an airtight seal with the user's face. Customized respirator mask insert 1200 also includes an interior filter support structure 1415 that includes a plurality of holes, or openings, 1420 that allow for the exchange of filtered air between a filter media (not shown) positioned between filter support structure 1415. Customized respirator mask insert 1200 also includes a cavity 1425, or negative space in which the user's nose and mouth may reside when customized respirator mask insert 1200 is worn.

Figure 15:
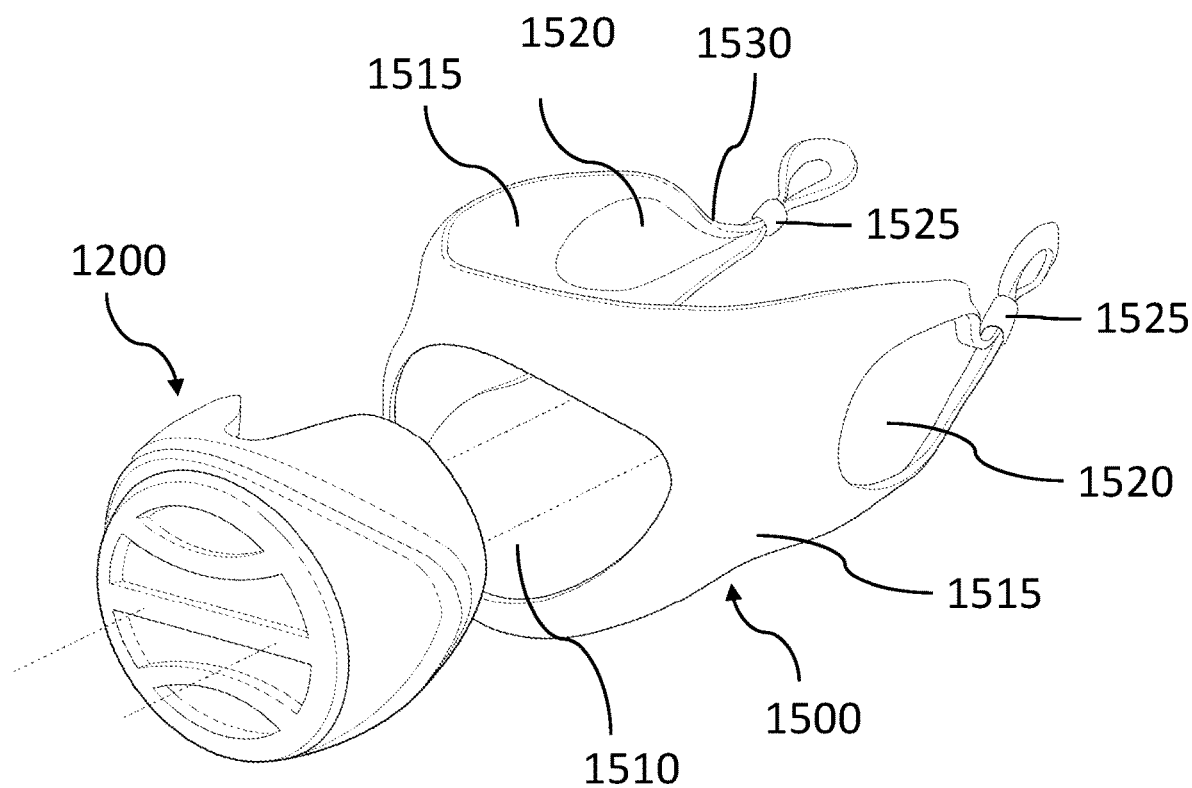
FIG. 15 provides a rear perspective view of customized respirator mask insert being inserted into an opening present within a donning mechanism, in accordance with some embodiments of the present invention.

Customized respirator mask insert 1200 may be inserted into an opening 1510 present within a donning mechanism 1500 as shown in FIG. 15. Insertion of customized respirator mask insert 1200 into opening 1510 may be facilitated by, for example, deformation of respirator mask gasket 1210 so that it fits through opening 1510 and then expands, or returns to its original shape, once within opening 1210 so that customized respirator mask insert 1200 is securely retained within opening 1210 via, for example, mechanical forces. Fixation of customized respirator mask insert 1200 within opening 1210 may also be facilitated by, for example, magnets, screw mechanisms, clamps, and/or snaps.

Donning mechanism 1500 may be configured to house customized respirator mask insert 1200 and facilitate the wearing of customized respirator mask insert 1200 by extending along either side of the user's face and wrapping around the user's ears. More specifically, donning mechanism 1500 may include two panels 1515 of material, a pair of ear openings 1520 that are established by ear loops 1530 of fabric/material of donning mechanism, and a pair of sliding toggles 1525 which may be configured to slide along the material of the ear loops that create ear openings 1520 so as to adjust a length thereof so that a user may adjust how the donning mechanism 1500 fits his or her face. In some embodiments, ear loops 1530 may be elastic. Donning mechanism 1500 may be made from any appropriate material including, but not limited to, fabric, cloth, spandex, silicon, rubber, plastic, paper, and, in some instances, may be made from a material configured to stretch or expand/contract. In some embodiments, donning mechanism 1500 may come in different sizes (e.g., small, medium, large, etc.), colors, and/or designs. Also, it will be understood that while the donning mechanism 1500 of FIG. 15 has over-ear straps, a donning mechanism that has one or more straps that wrap around the user's head instead of over-ear straps is also within the scope of the invention.

In some embodiments, donning mechanism 1500 may be deliberately detachable from customized respirator mask insert 1200 so that, for example, donning mechanism 1500 and/or customized respirator mask insert 1200 may be washed and/or sanitized.

In some embodiments, a configuration of donning mechanism 1500 may be responsive to a situation in which it is expected to be used. For example, a donning mechanism may be adapted for use in a medical setting and/or in a setting where the user is working with hazardous chemicals.

Figure 16:
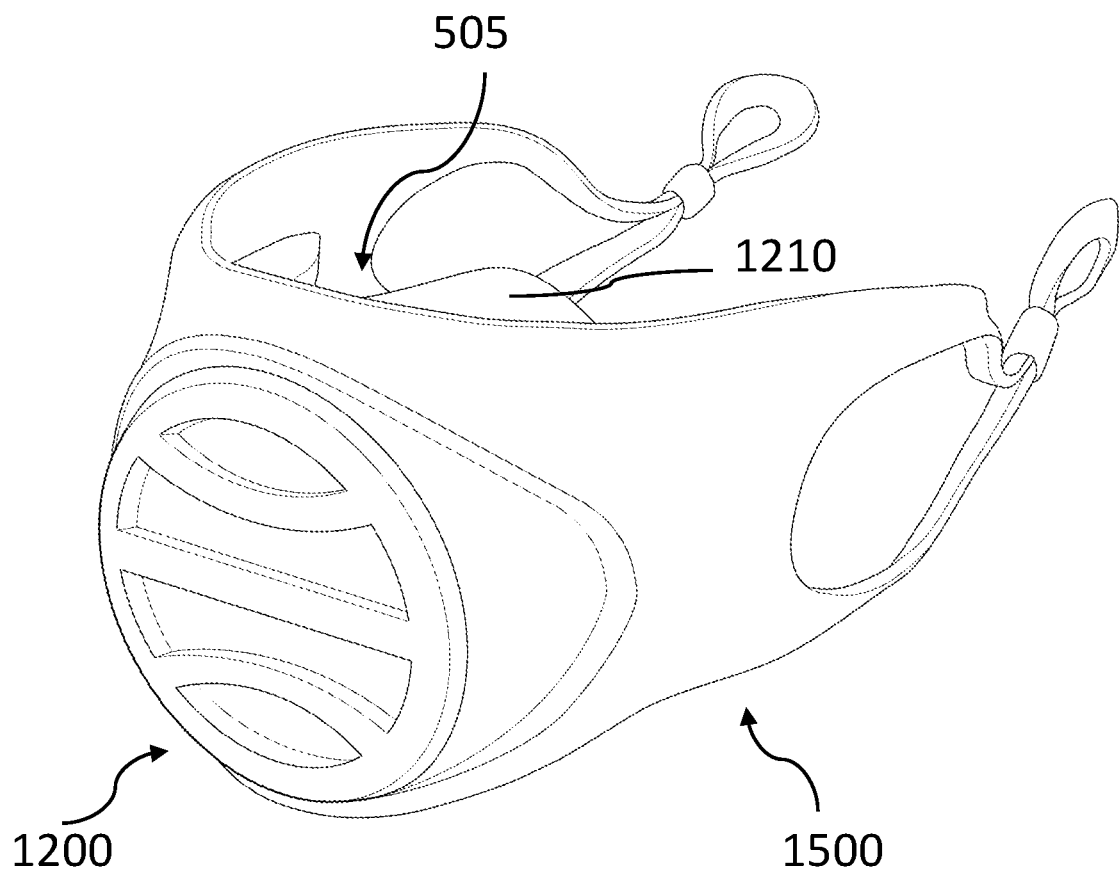
FIG. 16 is a front perspective view of a fully assembled customized respirator mask with customized respirator mask insert positioned within donning mechanism, in accordance with some embodiments of the present invention.
Figure 17:
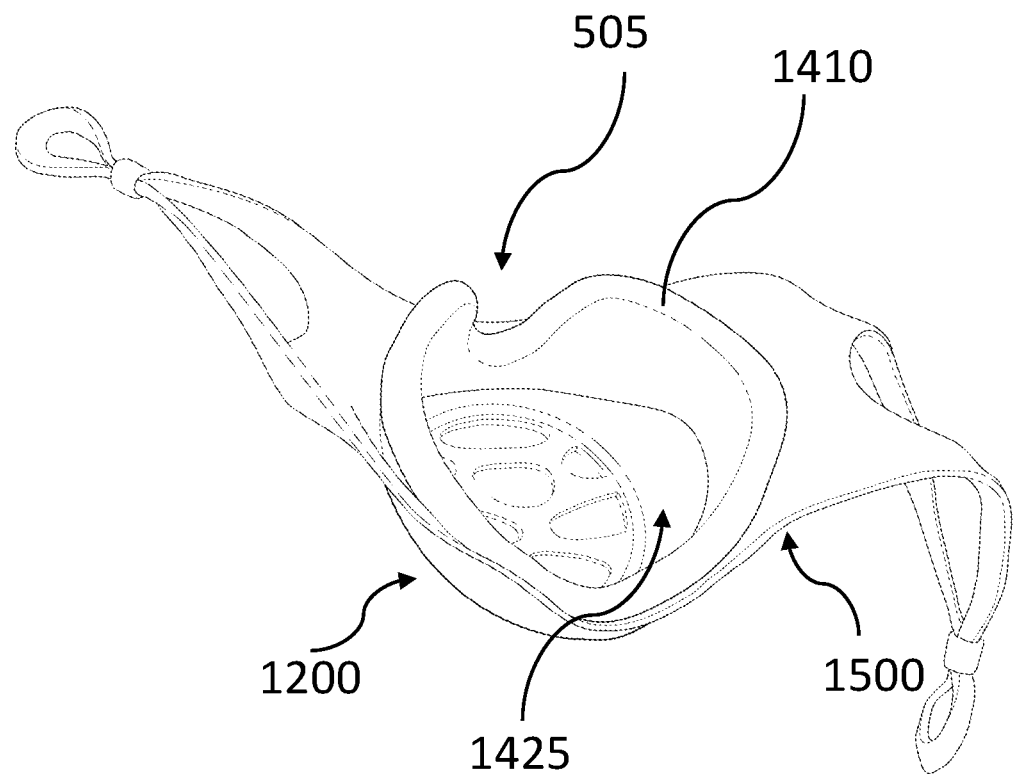
FIG. 17 is a rear perspective view of a fully assembled customized respirator mask with customized respirator mask insert positioned within donning mechanism, in accordance with some embodiments of the present invention.

FIG. 16 is a front perspective view of a fully assembled customized respirator mask 1600 with customized respirator mask insert 1200 positioned within donning mechanism 1500 and FIG. 17 is a rear perspective view of a fully assembled customized respirator mask 1600 with customized respirator mask insert 1200 positioned within donning mechanism 1500.

Figure 18:
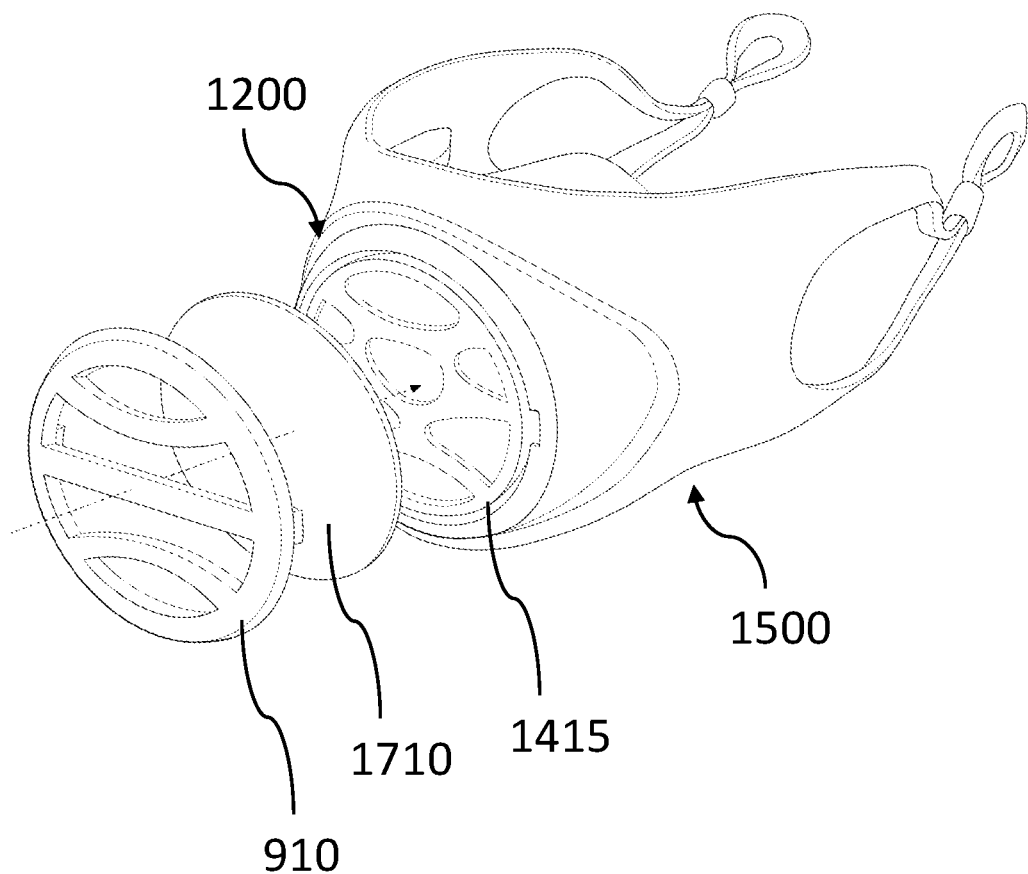
FIG. 18 provides an exploded view of customized respirator mask insert showing an exemplary way respirator filter cap may be separated from a filtration media and interior filter support structure, in accordance with some embodiments of the present invention.

On some occasions, a filtration media resident within customized respirator mask insert 1200 may be replaced via, for example, removing respirator filter cap 910 and positioning filtration media between respirator filter cap 910 and interior filter support structure 1415 so that the filtration media may filter air/gas coming into and out of assembled customized respirator mask 1600. FIG. 18 provides an exploded view of customized respirator mask insert 1200 showing an exemplary way respirator filter cap 910 may be separated from a filtration media 1710 and interior filter support structure 1415. In order to fix filtration media 1710 into customized respirator mask insert 1200, filtration media 1710 may be inserted into a recess provided by interior filter support structure 1415 and then respirator filter cap 910 may be affixed to interior filter support structure 1415 via, for example, pinning, pin, screwing via, for example, a bayonet-type mechanism and/or snapping respirator filter cap 910 into place. Additionally, or alternatively, respirator filter cap 910 may be magnetically attached to interior filter support structure 1415 via magnetic attraction. Additionally, or alternatively, respirator filter cap 910 may be attached to interior filter support structure 1415 via friction and/or another attachment mechanism (e.g., VELCRO or glue). Exemplary filtration media 1710 includes, but is not limited to, fabric, nanofiber filtration media, N95 filtration media, and/or KN95 filtration media.

Figure 19:
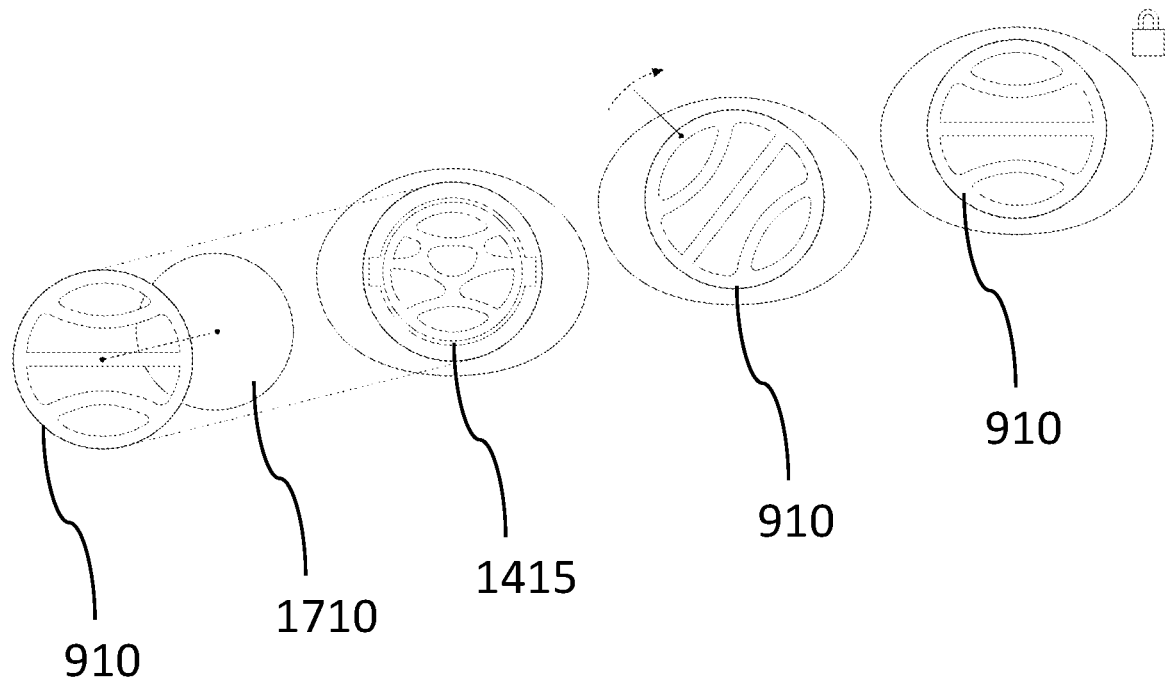
FIG. 19 provides an exploded view of customized respirator mask insert wherein the filtration media is secured in place via a twist-locking mechanism that cooperates between the respirator filter cap and the interior filter support structure of the customized respirator mask insert.

FIG. 19 provides an exploded view of customized respirator mask insert 1200 wherein filtration media 1710 is secured in place via a twist-locking mechanism that cooperates between respirator filter cap 910 and the interior filter support structure 1415 of customized respirator mask insert 1200. As shown in FIG. 19, filtration media 1710 may be aligned with respirator filter cap 910 and interior filter support structure 1415 so that filtration media 1710 fits within a recess of interior filter support structure 1415. Then respirator cap 915 may be aligned with interior filter support structure 1415 and may be twisted in place so that respirator cap 915 locks in place as shown in FIG. 19.

Figure 20:
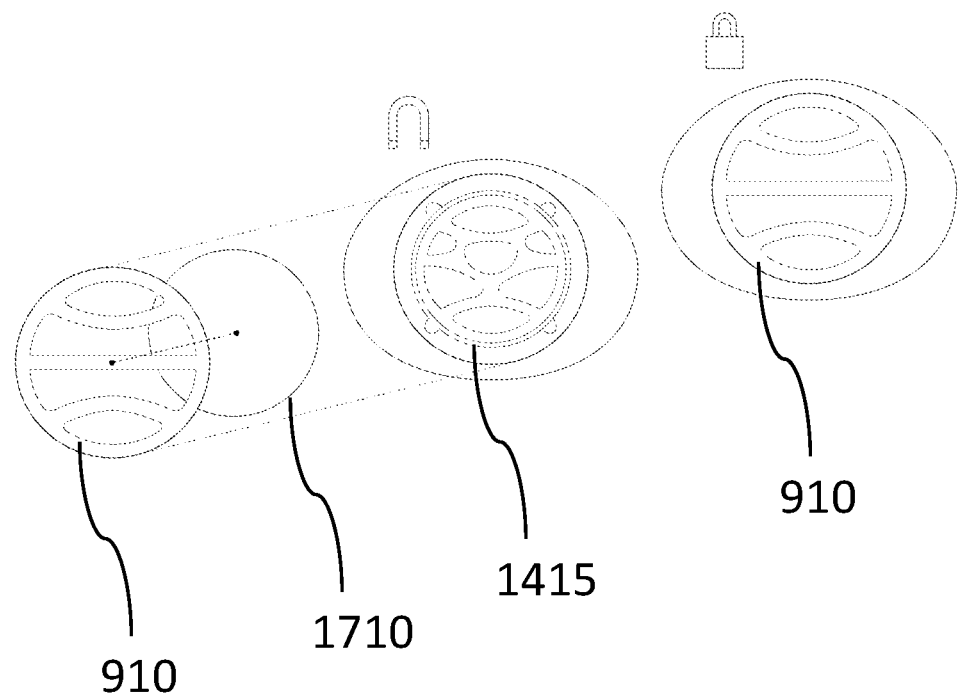
FIG. 20 provides an exploded view of customized respirator mask insert wherein the filtration media is secured in place via a magnetic locking mechanism that cooperates between the respirator filter cap and the interior filter support structure of the customized respirator mask insert.

FIG. 20 provides an exploded view of customized respirator mask insert 1200 wherein filtration media 1710 is secured in place via a magnetic locking mechanism that cooperates between respirator filter cap 910 and the interior filter support structure 1415 of customized respirator mask insert 1200. As shown in FIG. 20, filtration media 1710 may be aligned with respirator filter cap 910 and interior filter support structure 1415 so that filtration media 1710 fits within a recess of interior filter support structure 1415. Then respirator cap 915 may be aligned with interior filter support structure 1415 and and respirator cap 915 may be magnetically attracted to interior filter support structure 1415 via a magnetic catch (e.g., magnets of a polarity on respirator cap 915 and magnets of the opposite polarity on the interior filter support structure 1415) so that respirator cap 915 locks in place as shown in FIG. 20.

Figure 21:
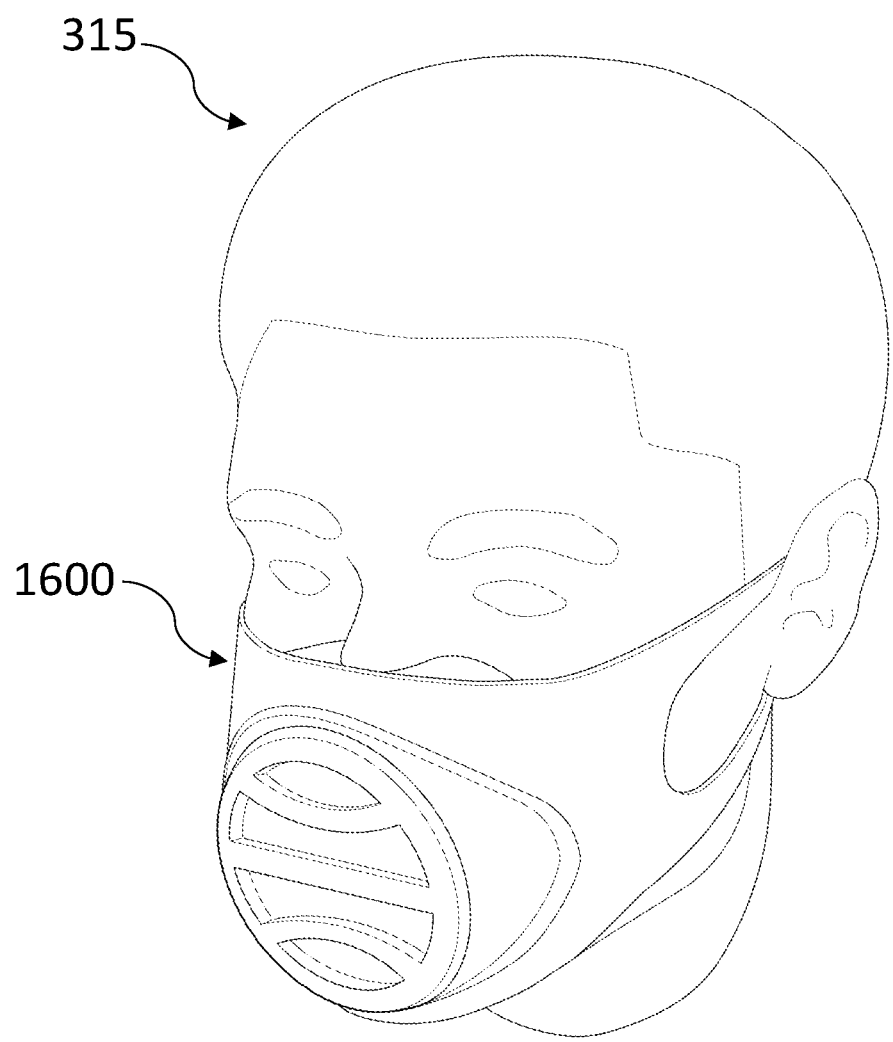
FIG. 21 provides a side perspective view of user wearing his or her customized fully assembled customized respirator mask, in accordance with some embodiments of the present invention.

FIG. 21 provides a side perspective view of user 315 wearing his or her customized fully assembled customized respirator mask 1600 that is designed and fabricated to fit the user's face, wherein donning mechanism 1500 is arranged on the users face so that the user's ears are positioned within ear openings 1520 and sliding toggles 1525 have adjusted a length of ear openings 1520 so that the fully assembled customized respirator mask 1600 fits comfortably and securely over the user's face.

We claim:

1. A method comprising:
receiving, by a processor, a three-dimensional scan of a portion of user's face including the user's nose and mouth;
analyzing, by the processor, the three-dimensional image of a portion of user's face to determine one or more features thereof;
receiving, by the processor, a respirator mask blank model;
modifying, by the processor, the respirator mask blank model responsively to the one or more features of the portion of user's face;
generating, by the processor, a model of a custom fit respirator mask configured to correspond to the portion of the user's face;
converting, by the processor, the model into a set of instructions for the manufacture of the custom fit respirator mask; and
communicating, by the processor, the set of instructions to a manufacturing machine.

2. The method of claim 1, wherein receiving the respirator mask blank further comprises:
selecting, by the processor, the respirator mask blank from a plurality of mask blanks responsively to the analysis of the three-dimensional image of a portion of user's face or the one or more features of the portion of the user's face.

3. The method of claim 1, wherein the modifying of the mask blank further comprises:
overlaying, by the processor, the respirator mask blank on the three-dimensional scan of a portion of user's face; and
performing, by the processor, a Boolean subtraction on the mask blank to subtract portions of the mask blank responsively to the one or more features of the user's face.

* * * * *